United States Patent [19]

Ezis et al.

[11] Patent Number: 4,496,503
[45] Date of Patent: Jan. 29, 1985

[54] METHOD OF MAKING A DENSIFIED SILICON NITRIDE/OXYNITRIDE COMPOSITE

[75] Inventors: Andre Ezis, Grosse Ile; Elaine C. Beckwith, Riverview; Howard D. Blair, Romulus, all of Mich.

[73] Assignee: Ford Motor Company, Dearborn, Mich.

[21] Appl. No.: 527,911

[22] PCT Filed: Jul. 19, 1983

[86] PCT No.: PCT/US83/01114
§ 371 Date: Jul. 19, 1983
§ 102(e) Date: Jul. 19, 1983

[51] Int. Cl.$^3$ ............................................. C04B 35/32
[52] U.S. Cl. ........................................ 264/56; 264/65; 264/66; 264/86; 264/176 R; 264/325
[58] Field of Search ............... 264/65, 332, 56, 66, 264/86, 176 R, 325; 501/98

[56] References Cited

U.S. PATENT DOCUMENTS

| | | | |
|---|---|---|---|
| 4,102,698 | 7/1978 | Lange | 264/65 |
| 4,264,548 | 4/1981 | Ezis | 264/65 |
| 4,384,909 | 5/1983 | Layden | 264/65 |
| 4,401,617 | 8/1983 | Ezis | 264/332 |

OTHER PUBLICATIONS

Wills et al., "Phase Relationships in the System $Si_3N_4-Y_2O_3-SiO_2$", *J. Materials Science*, 11, (1976), pp. 1305–1309.

*Primary Examiner*—John A. Parrish
*Attorney, Agent, or Firm*—Joseph W. Malleck; Olin B. Johnson

[57] ABSTRACT

A method of making a densified silicon nitride/oxynitride composite is disclosed. The method comprises: (a) shaping a substantially homogeneous powder mixture of silicon nitride, 6–18% yttrium silicon oxynitride of the $Y_{10}Si_6O_{24}N_2$ phase in an amount to form a viscous solution with at least a portion of the silicon nitride, and (b) densifying the body by heat fusion, with or without the use of mechanical pressure, to a density and a dimension required for the final product.

13 Claims, No Drawings

METHOD OF MAKING A DENSIFIED SILICON NITRIDE/OXYNITRIDE COMPOSITE

TECHNICAL FIELD

The invention relates to the technology of making silicon nitride by heat fusing a mixture of $Si_3N_4$ powder and densification aids.

BACKGROUND OF THE INVENTION AND PRIOR ART STATEMENT

In the art of making silicon nitride it is conventional to add certain oxides to the raw material from which the fully dense silicon nitride body is constituted; such oxides act as pressing aids or sintering aids (see U.S. Pat. No. 4,143,107). The presence of these oxides has required higher temperatures and pressures to reach full densification during hot pressing or sintering than what is optimally desired for a more economical process.

Generally, compounds other than oxides have been introduced to silicon nitride only as a result of chemical reaction during hot pressing or sintering (see U.S. Pat. Nos. 4,102,698; 4,341,874; and 4,350,771).

Thus, the prior art has recognized that secondary phases form from the oxides and ingredients of the basic mixture during hot pressing or sintering to produce silicates, complex oxides, and oxynitrides. With continuing research herein, it has been discovered that certain of these oxynitrides are more desirable than other oxynitrides and more desirable than silicates or oxides in promoting lower temperatures and pressures needed for processing. This selectively is due in part to the fact that certain of these compounds have a higher degree of solubility for silicon nitride, thus tending to promote a reduction in temperature and pressure needed for full dissolution of the silicon nitride during the heat fusion step.

What is needed is the ability to introduce chemical modifications to the mixture prior to hot pressing or sintering, which modifications allow for: (a) a reduction in the time and temperature required to hot press or sinter the mixture to a fully densified object; (b) freedom to increase the amount of silicate forming oxide to a higher controlled amount to optimize physical characteristics in the final object; and (c) closer control or selection of the desired secondary phase chemistry in the final product without total reliance on the vagaries of the chemical reaction during hot pressing or sintering.

SUMMARY OF THE INVENTION

The invention is a method of making a densified silicon nitride comprising object by the steps which consist essentially of: (a) shaping a substantially homogeneous powder mixture of silicon nitride and yttrium silicon oxynitride, the latter being present in an amount sufficient to form a viscous solution with at least a portion of the silicon nitride during fusion heating, said shaping being carried out to form an object of less than required dimension and density; and (b) densifying the body by heat fusion, with or without the use of mechanical pressure, to a density and a dimension required for the final product.

The homogeneous powder mixture may be prepared by either mixing silicon nitride powder directly with independently prepared yttrium silicon oxynitrides, in the proportions required, or the mixture may be formed by mixing silicon nitride with oxides which are reactive during a preliminary nonfusing heating step to form in situ yttrium silicon oxynitride. The yttrium silicon oxynitride utilized or prepared by both modes should advantageously be at least 75% of the $Y_{10}Si_6O_{24}N_2$ phase. The $Y_{10}Si_6O_{24}N_2$ phase, sometimes referred to as the H phase, has been discovered to have a higher degree of solubility for silicon nitride than other readily formed secondary phases. The H phase can be more readily converted to the K phase (having the formula $YSiO_2N$) during the heat fusion step, the latter phase being particularly desirable because of a more stable crystalline characteristic.

The independently prepared yttrium silicon oxynitride should preferably have a purity of 98% or greater and should preferably be introduced in an amount of 6–18% by weight of the mixture. The mixture, for the cold formed mode utilizing a preliminary nonfusing heating step, preferably comprises by weight 4–12% $Y_2O_3$, 1–3.5% $SiO_2$, and 0.4–3.0% $Al_2O_3$. $SiO_2$ can be added if sufficient oxygen is not present as $SiO_2$ on the surfaces of the $Si_3N_4$ powder. The preliminary nonfusing heating step preferably is carried out in an inert atmosphere, such as argon, preferably to a temperature range of 1500°–1550° C. (2732°–2822° F.) for a period of 4–8 hours, and most advantageously for about 6 hours. The powder mixture can be cooled down before it is transferred to a different furnace for carrying out the heat fusing densifying step, such as for hot pressing or pressureless sintering.

It is preferable that the powder of the mixture be controlled as to particle size, each particle being limited to 24 microns or less. The powder can be preferably shaped by any mode of the group comprising: extrusion, cold compaction, slip casting, hydrostatic pressing, and heat agglomeration in a die.

The full densifying step can be preferably carried out for simple shapes by hot pressing at a temperature of 1600°–1700° C. (1912°–3092° F.) at a pressure of 2500–4000 psi for a period of about 30–80 minutes, and most advantageously for about 60 minutes. The full densification step may also be carried out by sintering, without the use of pressure normally associated with hot pressing, at a temperature of 1704°–1760° C. (3100°–3200° F.) for a period of about 2–12 hours, and most advantageously for about 6 hours.

BEST MODE FOR CARRYING OUT THE INVENTION

A preferred mode for carrying out the present invention is as follows.

1. Mixture Forming

A homogeneous powder mixture of silicon nitride powder, yttrium silicon oxynitride powder, and aluminum oxide powder is blended together and milled. The addition of a glass former in the form $Al_2O_3$ is made to provide a thin silicate coating on the grains of the oxynitride in the final fused product. The silicate has little or no microporosity and protects the oxynitride against high temperature oxidation.

Quantitatively, the mixture is prepared with 3200 grams of $Si_3N_4$ (88.2 weight percent of the mixture), 362 grams of the $Y_{10}Si_6O_{24}N_2$ phase (10.3 weight percent of the mixture, and 53 grams of $Al_2O_3$ (1.5 weight percent of the mixture. The useful range for the yttrium silicon oxynitride is 6–18% by weight of the mixture.

The silicon nitride powder is selected to have a purity of 98% or greater and a starting maximum particle size of 24 microns or less. The major trace metal contaminants experienced with such purity include, as a maximum: iron—1.0%; aluminum—0.5%; manganese—0.09%, and Ca—0.02%. Nonmetallic contaminants include, as a maximum: carbon—0.05%; and oxygen—less than 1.75%.

The yttrium silicon oxynitride powder is selected to have a purity of at least 99.0% with a maximum grain size of 16 microns or less. The $Al_2O_3$ powder is selected to have a purity of at least 99.5% with a maximum particle size of 10 microns or less and with an average particle size of 2–3 microns. These maximum particle sizes are given with respect to size after milling.

The mixture is comminuted and blended by being charged into an inert milling jar along with grinding media in the form of $Si_3N_4$ cylinders of composition identical to that of final desired product composition. The mixture is milled wet, using absolute methanol, for about 48 hours at 64 rpm and then separated from the milling media by use of an #10 mesh screen. The mixture is dried and then dry milled in an inert jar for two hours to effect agglomerate break-up.

2. Shaping

The milled or comminuted mixture is then shaped to form a body of a general dimension and configuration that is desired. For simple shapes, for example, it is preferable that the shaping be carried out by loading the milled mixture into a pressing die arrangement and cold pressed by use of 1400–1500 psi to form a disc shaped compact or preform of a size of about 6" in diameter by 0.6" thick with an accompanying density of about 1.7 gm/cm$^3$. However, the shaping step can be carried out successfully by any of the following modes: extrusion, slip casting, heat agglomeration in a die, hydrostatic pressing, or by the preferred cold compacting. The choice of the mode is dependent on complexity of the part to be produced and the green density desired.

3. Full Densification

The shaped body is preferably hot pressed to produce a silicon nitride comprising object of required dimension and density. A pressing fixture having graphite walls is used to carry out hot pressing. The walls and shaped body are both coated with a slurry of boron nitride and dried. The pressing fixture, with the shaped body therein, is placed in the hot pressing furnace. The heating and pressing is carried out preferably in increments: (1) a mechanical loading of 1000 psi is applied at room temperature to the body; (2) the temperature is increased to 2500° F. (1371° C.) and pressure simultaneously increased to 2500 psi; (3) the temperature is finally increased to the ultimate hot pressing temperature of 1600°–1700° C. (2912°–3092° F.), and optimally to 1625° C. (2957° F.) and pressure is increased to 3000–4000 psi, optimally 3500 psi. The latter conditions are maintained until at least 99% or desirably 99.5% of full theoretical density is achieved. This usually requires 0.25–3.0 hours, depending on the volume and chemistry of material to be densified, at the ultimate hot pressing temperature, advantageously about 30–80 minutes or optimally 60 minutes. The object is then cooled at any rate, even quenched, to room temperature.

Alternatively, for shaped bodies having green densities greater than 2.0 gm/cm$^3$, the full densification may be achieved by a sintering operation, whereby heating is carried out for a period of time to substantially fully densify the shaped body and form a product of required dimension and density. The sintering is carried out at a temperature level effective to sinter, but without sublimation of the silicon nitride, such temperature being preferably in the range of 1704°–1760° C. (3100°–3200° F.). The heating can be carried out in an ambient atmosphere without the use of mechanical or atmospheric over-pressure, or by the use of a packing blanket of a ceramic medium, such as a loose silicon nitride powder. The heat-up to the sintering temperature is at a rate of about 600° C. per hour to the sintering temperature of 3150° F. (1732° C.) and held at this temperature for a time sufficient (such as 2–12 hours) to permit achieving full theoretical density.

During heat fusing, the $Y_{10}Si_6O_{24}N_2$ phase and silicates contained therein will liquify and dissolve $Si_3N_4$. Upon recrystallization, the yttrium silicon oxynitride will reappear predominantly as the $YSiO_2N$ phase which is more thermally and chemically stable.

The object resulting from hot pressing or sintering will consist essentially of beta silicon nitride, 10.0–11.5% by weight yttrium silicon oxynitride predominantly of the $YSiO_2N$ phase and minor amounts of $Y_{10}Si_6O_{24}N_2$, the crystallites being enveloped by up to 3% of a silicate phase having a thickness of 2–10 angstroms and having no microporosity. Achieving the $Y_1$ phase in the final product is brought about by the conversion of the $Y_{10}$ phase at lower hot pressing temperature while still carrying out full dissolution of the $Si_3N_4$. During sintering, oxygen is lost through formation of silicon monoxide, thereby driving the oxynitride phase to a lower molar $SiO_2$ form. A corresponding weight loss, of less than 1%, accompanies this conversion. The object preferably possesses a hardness of 88.0–92.0 on the 45-N scale, a density of 3.2–3.35 gm/cm$^3$, and an average fracture strength of 85,000 psi or above at 1200° C. in a 4-point bend test, and an oxidation resistance that prevents weight pickup by the object after 450 hours in air at 1000° C. Some yttrium silicon oxynitrides of the $Y_{10}Si_6O_{24}N_2$ and $Y_4Si_2O_7N_2$ phases can be tolerated up to 25% of the second phases present in the object.

Alternative Mixture Formation

Alternatively, the yttrium silicon oxynitride may be introduced to the mixture by originally mixing silicon nitride powder with stoichiometric amounts of oxides effective to form the necessary amount of yttrium silicon oxynitride of the $Y_{10}Si_6O_{24}N_2$ phase by a preliminary heat treatment. Preferentially, such oxides comprise 4–12% (by weight of the mixture) of $Y_2O_3$ and 1–3.5% $SiO_2$, some of said $SiO_2$ may be constituted as an oxide coating present on the silicon nitride powder. Additionally, $Al_2O_3$ may be added, again in an amount of 0.4–3.0% to form a thin silicate coating on the yttrium silicon oxynitride grains.

The preliminary heating is carried out in an inert atmosphere, such as argon, and heating is to a temperature in the range of 2732°–2822° F. (1500°–1550° C.) for a period of about 4–8 hours. The prereacted powder mixture is then reground into a uniform homogeneous powder mixture and may be slip cast to form a shaped body in preparation for the final heat fusion step. Slip casting may be carried out by mixing the powder mixture with water (as a polar vehicle) and a deflocculant, in proper proportions, so that the slurry formed can be inserted into a shaping porous fixture and cast.

EXAMPLES

A series of samples were prepared and tested as to physical parameters to illustrate how variations in the processing and chemistry facilitate or deny obtaining the advantages of this invention.

Samples 1-3 were prepared by mixing and comminuting $Si_3N_4$ powder with a varying amount of a yttrium silicon oxynitride, along with 2% $Al_2O_3$. The mixture was cold compacted (into 6" diameter preforms by 0.6" thick), and hot pressed at 1625° C. (2957° F.) for one-half hour at a final hot press pressure of 3500 psi. The densified samples were measured as to chemistry content, density, strength, hardness, and high temperature stability. Sample 1 employed 10% $Y_{10}Si_6O_{24}N_2$ phase in the mixture, and the resulting object exhibited (a) 10.8% $Y_1SiO_2N$ phase, approximately 2% silicate, and the remainder essentially beta $Si_3N_4$; (b) 107,000 psi (average) at 1200° C. in a 4-point bend test; (c) 91 hardness on 45-N scale; and (d) an oxidation resistance that prevents weight pickup by the object after 450 hours in air at 1000° C. Sample 2 employed only 1% $Y_{10}$ in the mixture. The resulting object exhibited poor density, approximately 65% of full theoretical density. Sample 3 substituted 10% $Y_4Si_2O_7N_2$ phase for the 10% $Y_{10}$ phase of Sample 1. The resulting object exhibited poor density, 87% of full theoretical density.

Samples 4-5 were prepared by mixing $Si_3N_4$ powder with 8% by weight $Y_2O_3$ and 2% $Al_2O_3$. The $SiO_2$ content was determined to be 2.6% by weight of the silicon nitride by oxygen determination of the silicon nitride powder. The mixture was cold compacted and given a preliminary heat treatment to form the $Y_{10}Si_6O_{24}N_2$ phase, then hot pressed as in Examples 1-3. Sample 4 was given a preliminary heat treatment at 1525° C. (2777° F.) for 6 hours. The resulting object exhibited excellent results, as those demonstrated in Sample 1. Sample 5 was given a preliminary heat treatment at 1525° C. (2777° F.) for one hour. The resulting object exhibited an undesirable amount of nonreacted $Y_2O_3$ with little $Y_{10}Si_6O_{24}N_2$ produced. Strength and hardness were below acceptable standards due to incomplete densification under the above described hot pressing conditions. In all of the samples, reduced silicon carbide formation was observed, principally due to the ability to hot press at lower temperatures, pressure, and shorter times.

Accordingly, to be able to hot press at the lower temperatures of about 1625° C. (2957° F.) for short time periods and still obtain predominantly the $Y_1SiO_2N$ second phase in the final fused body, the $Si_3N_4$ mixture must contain 6-18% of the $Y_{10}Si_6O_{24}N_2$ phase prior to heat fusion.

For densification by sintering, Sample 6 was prepared by regrinding the heat treated powder of Sample 4 and slip casting the material to a green density greater than 2.0 $gm/cm^3$. The cast material was sintered for 8 hours at 1750° C. Full density was achieved and the product had an average strength of 98,000 psi at 1200° C., a hardness (45-N) of 88.5, and good oxidation resistance. In Sample 7, the same material as in Sample 5 was reground, slip cast, and sintered. No density increase was observed, and an 8% weight loss occurred.

We claim:

1. A method of making a densified silicon nitride comprising object, by the steps of:
   (a) shaping a substantially homogeneous powder mixture of silicon nitride and yttrium silicon oxynitride, the latter being present in an amount sufficient to form a viscous solution with at least a portion of said silicon nitride during fusion heating, said shaping being carried out to form an object of less than required dimension and density; and
   (b) densifying said shaped body by heat fusion, with or without the use of mechanical pressure, to constitute an object of required density and dimension.

2. The method as in claim 1, in which said yttrium silicon oxynitride is at least 75% of the $Y_{10}Si_6O_{24}N_2$ phase.

3. The method as in claim 2, in which said yttrium silicon oxynitride is independently prepared and introduced to said mixture in an amount of 6-18% by weight of the mixture.

4. The method as in claim 3, in which said independently prepared yttrium silicon oxynitride has a purity of at least 98.0%.

5. The method as in claim 1, in which said mixture to be shaped is formed by mixing silicon nitride with stoichiometric amounts of oxides which are reactive during a preliminary nonfusing heating step to form an in situ silicon oxynitride, said preliminarily heated mixture then being reground to be subjected to shaping.

6. The method as in claim 5, in which oxides comprise $Y_2O_3$ and $SiO_2$, and said in situ formed oxynitride is yttrium silicon oxynitride.

7. The method as in claim 5, in which said preliminary nonfusing heating is carried out at a temperature level of 2732°-2822° F. (1500°-1550° C.), said heating being continued for a period of 4-8 hours.

8. The method as in claim 5, in which said preliminary heating is carried out in an inert atmosphere.

9. The method as in claim 1, in which said mixture is comprised of particles no greater than 24 microns.

10. The method as in claim 1, in which said shaping is carried out by one of the following modes: extrusion, cold compaction, slip casting, heat agglomeration in a fixture, and hydrostatic pressing.

11. The method as in claim 1, in which said densifying step is carried out by hot pressing to an ultimate temperature level of 1600°-1700° C. (2912°-3092° F.) under a pressure of 2500-4000 psi for a period of time of about 30-80 minutes.

12. The method as in claim 1, in which said densification step is carried out by sintering said body to a temperature level of 1704°-1760° C. (3100°-3200° F.) for a period of time of 2-12 hours without the use of pressure normally associated with hot pressing.

13. A method of making a silicon nitride comprising object, by the steps of:
   (a) shaping a substantially homogeneous mixture of silicon nitride, 6-18% yttrium silicon oxynitride of the $Y_{10}Si_6O_{24}N_2$ phase, and 0.4-3% $Al_2O_3$, to form an object of less than required density and dimension; and
   (b) densifying said shaped body by heat fusion, with or without the use of pressure, to constitute an object of required density and dimension.

* * * * *